A. A. AUGUSTUS.
VEHICLE TOP.
APPLICATION FILED JUNE 1, 1915.
1,340,518.
Patented May 18, 1920.
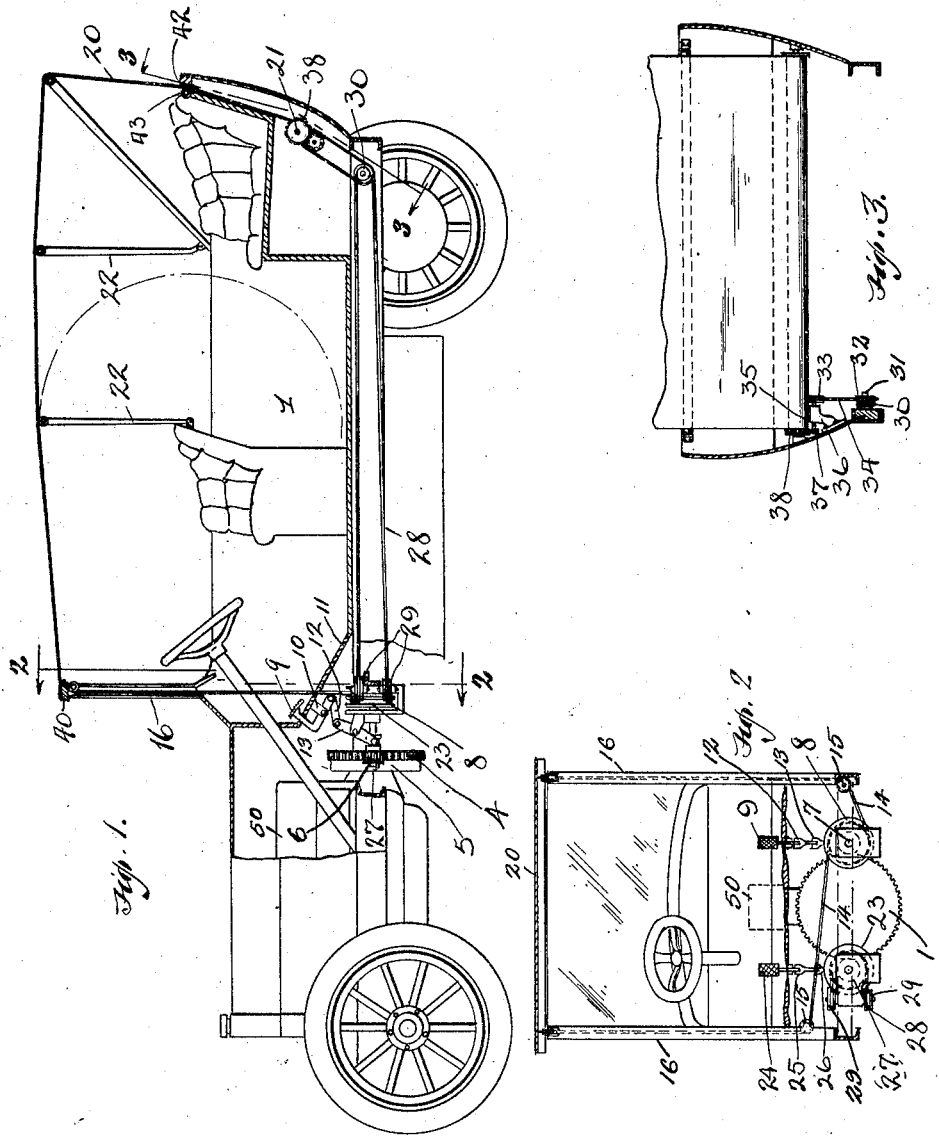
WITNESSES=
O. M. Kappler
Thos. H. Fay
INVENTOR
Albert A. Augustus
By Fay, Oberlin & Fay
ATTORNEYS

UNITED STATES PATENT OFFICE.

ALBERT A. AUGUSTUS, OF CLEVELAND, OHIO.

VEHICLE-TOP.

1,340,518.     Specification of Letters Patent.     Patented May 18, 1920.

Application filed June 1, 1915. Serial No. 31,319.

*To all whom it may concern:*

Be it known that I, ALBERT A. AUGUSTUS, a citizen of the United States, and a resident of Cleveland, county of Cuyahoga, and State of Ohio, have invented a new and useful Improvement in Vehicle-Tops, of which the following is a specification, the principle of the invention being herein explained and the best mode in which I have contemplated applying that principle, so as to distinguish it from other inventions.

The present invention relates in general to vehicle tops and means for raising and lowering the same. The raising and lowering of tops such as are in general use on motor vehicles has been found to be a laborious performance, and the present invention more particularly provides power means for raising and lowering the top, and also a suitable form of top which can be raised and lowered easily and stored in the vehicle body when not in use. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1 is a side elevation, partly in section, of a motor vehicle showing my top and the operating means therefor, the top being shown in raised position; Fig. 2 is a section on the line 2—2 of Fig. 1; and Fig. 3 is a section on the line 3—3, in Fig. 1.

In the drawings I have shown a motor vehicle 1, provided with a propelling motor 50, which has a large gear 4 attached to, or made integral with the fly-wheel 5. Mounted on a shaft 7, rotatably carried by a bracket attached to the vehicle frame, is a winding drum 8. Slidably mounted on the shaft 7 is a gear 6 adapted to be moved into engagement with the fly-wheel gear 4 by means of a pedal 9. This pedal is pivotally mounted on an arm 10 attached to the footboard 11 of the vehicle, and the pedal is connected to the sliding gear by means of links 12 and 13 so that downward movement of the pedal will cause the gear 6 to engage with the fly-wheel gear 4. A second winding drum 23 is similarly mounted on the opposite side of the fly-wheel and this drum is adapted to be operatively connected to the fly-wheel by movement of a pedal 24, which moves a sliding gear 27 by means of the links 25 and 26.

At the front of the vehicle, two hollow upright members 16 are mounted, and these members are placed at the sides of the vehicle and are adapted to act as the windshield frame. These members extend downwardly to the vehicle frame. Attached to the drum 8 are cables 14, which extend laterally over sheaves 15 and then upwardly through the members 16. The cables are adapted to detachably engage the front bow 40 of the top.

The top 20 consists of a strip of suitable fabric of approximately the width of the vehicle and this strip is adapted to be wound upon a roller 21, mounted at the rear of the vehicle, preferably underneath the rear seat. The top is adapted to slide over bows 22 and be fastened to the windshield frame by the front cross-member 40. The bows 22 are adapted to be folded down out of the way when not in use.

In operating this top, when it is desired to raise the same, the cables 14 are connected to the cross-member 40, and the winding drum 8 is operated by moving the pedal 9 to pull the top out over the bows until the cross-member engages with the windshield frame.

To lower the top, the drum 23 is actuated and this drum is provided with a continuous cable 28, which extends over sheaves 29, and rearwardly around a pulley 30, rotatably mounted on a shaft 31, together with a gear 32, the shaft 31 being mounted in the vehicle frame. The roller 21 has attached thereto a gear 38 which is in mesh with a small gear 37 carried by a shaft 35 rotatably mounted in a bracket 36 carried by the vehicle body. This shaft 35 has upon the other end, a sprocket 33, which is connected to the gear 31 by means of an endless chain 34.

Thus, to lower the top the winding drum 8 will be disengaged and the winding drum 23 will be operated to wind the top upon the roller 21, by means of the mechanism just described. The rear of the vehicle body is of course made with an opening 42 of sufficient width to allow the fabric to enter easily, and a roller 43 will be provided to prevent wear.

In winding the top, to prevent injury by failure to stop the rotation of the drums at the correct time, the frictional engagement between the cables and the drums and pulleys will be light enough to allow the cable to slip before the top would tear.

I therefore particularly point out and distinctly claim as my invention:—

1. In a vehicle the combination of a motor, a top, top supports, a winding drum operable by said motor, means connecting said drum and said top, whereby rotation of said drum in one direction is adapted to raise said top over said supports, a second drum operable by said motor, and other means connecting said top and said second drum and adapted to lower said top upon rotation of said second drum.

2. In a vehicle the combination of a motor, a top, top supports, a winding drum operable by said motor, a cable attached to said drum and adapted to raise said top over said supports upon rotation of said drum in one direction, a second drum operable by said motor, a second cable attached to said second drum and adapted to lower said top upon rotation of said second drum in one direction and means for operatively connecting said drums with said motor as desired.

3. In a vehicle the combination of a motor, a top, top supports, a winding drum operable by said motor, means connecting said drum and said top whereby actuation of said drum is adapted to raise said top over said supports, a second drum operable by said motor, a roller carried by said vehicle and adapted to receive said top thereon, means operably connecting said second drum and said roller whereby actuation of said drum operates said roller to wind said top thereon.

4. In a vehicle the combination of a motor, a top, a roller adapted to receive the same, means operable by said motor and adapted to actuate said roller to lower said top, other means operable by said motor and adapted to raise said top.

5. In a vehicle the combination of a top, a roller mounted at the rear of said vehicle and adapted to receive said top thereon, means operably connecting said motor and said roller, said roller being adapted upon actuation to wind said top thereon thereby lowering the same, and other means operable by said motor and adapted to raise said top.

6. In a vehicle the combination of a top, a roller mounted at the rear of said vehicle and adapted to receive said top thereon, means normally inoperative but adapted in one position to operably connect said top and said roller to actuate the same thereby winding said top thereon, and other means normally inoperative but adapted to be operably connected with said motor to raise said top.

Signed by me, this 28th day of May, 1915.

ALBERT A. AUGUSTUS.

Attested by—
J. S. VAN NORSTRAND,
THOMAS F. COLE.